(12) United States Patent  
Lawn

(10) Patent No.: US 9,060,015 B2
(45) Date of Patent: Jun. 16, 2015

(54) SIP MEDIA RETRY

(75) Inventor: Jonathan Lawn, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 87 days.

(21) Appl. No.: 13/600,849

(22) Filed: Aug. 31, 2012

(65) Prior Publication Data

US 2013/0232273 A1    Sep. 5, 2013

(30) Foreign Application Priority Data

Aug. 31, 2011  (GB) .................................. 1115027.3

(51) Int. Cl.
| | | |
|---|---|---|
| H04L 29/08 | (2006.01) | |
| H04L 29/12 | (2006.01) | |
| H04L 29/06 | (2006.01) | |
| H04M 7/00 | (2006.01) | |

(52) U.S. Cl.
CPC .......... *H04L 67/141* (2013.01); *H04L 61/2528* (2013.01); *H04L 65/80* (2013.01); *H04L 65/1086* (2013.01); *H04M 7/0072* (2013.01)

(58) Field of Classification Search
None
See application file for complete search history.

(56) References Cited

U.S. PATENT DOCUMENTS

| | | |
|---|---|---|
| 2004/0095958 A1 | 5/2004 | Ejzak et al. |
| 2004/0240399 A1* | 12/2004 | Corrao et al. ................. 370/260 |
| 2005/0169207 A1 | 8/2005 | Muniere |
| 2008/0279097 A1 | 11/2008 | Campion et al. |
| 2009/0047936 A1 | 2/2009 | Kampmann et al. |
| 2009/0076802 A1 | 3/2009 | Witzel et al. |
| 2009/0154658 A1* | 6/2009 | Kasper et al. .............. 379/32.01 |
| 2009/0327499 A1* | 12/2009 | Strickland et al. ........... 709/228 |
| 2012/0185600 A1* | 7/2012 | Belling et al. ................ 709/227 |
| 2012/0271948 A1* | 10/2012 | Martin ......................... 709/226 |

FOREIGN PATENT DOCUMENTS

| | | |
|---|---|---|
| EP | 1079573 A2 | 2/2001 |
| WO | 2004/064353 A1 | 7/2004 |
| WO | 2008/083470 A1 | 7/2008 |

* cited by examiner

*Primary Examiner* — Ario Etienne
*Assistant Examiner* — Clayton R Williams
(74) *Attorney, Agent, or Firm* — EIP US LLP

(57) ABSTRACT

Methods, apparatuses and computer programs for selecting a codec for use by a communications device for a session over a network, having a transcoding resource, are provided. It is determined whether the transcoding resource is available for the communications session and, if the transcoding resource is available, a subset of codecs available to the communications device is used in a signalling process used to determine a codec for the session. The subset is selected based on an operative condition affecting the communications device.

18 Claims, 7 Drawing Sheets

SIP MEDIA RETRY

CROSS REFERENCE TO RELATED APPLICATION

This application claims priority to foreign Patent Application No. GB 1115027.3, filed on Aug. 31, 2011, the content of which is hereby incorporated by reference herein in its entirety.

FIELD OF THE INVENTION

The present invention relates to systems and methods for selecting codecs in a communications system and in particular to selecting a codec based on a property indicative of a condition affecting a communications device.

BACKGROUND

Communications devices, such as computers and mobile telephones, are able to communicate using a number of different coders/decoders (codecs). A codec is a device or computer program (i.e. hardware, software, or a combination of the two) capable of encoding and/or decoding a data which is sent from and/or received by the communications device. Codecs are typically used to encode audio and/or video data streams. A codec will typically use a particular, standardised, protocol (specific to that type of codec) to encode and decode the data.

There are a large number of codecs available for communications, and any given communications device will likely be able to communicate using (i.e. have available) a limited number of these codecs. The ability to use a particular codec will depend on a number of factors, including (for example) the processing power of the device, if suitable dedicated hardware is available, and whether appropriate software is installed.

Each codec has certain strengths (and corresponding weaknesses) which make the codec more suitable for certain communications and less suitable for other types of communications. For example, some codecs are optimised for a relatively high bandwidth, while are optimised for require a much lower bandwidth (with a corresponding drop in quality). Some codecs are more resilient to communication problems, such as dropped packets, than others. Certain codecs are optimised for a particular type of media content, such as speech, while others are more suited for a different type of media content e.g. music.

One known method of selecting a codec for use in a communications session between two communications devices, or endpoints, as used in the Session Initiation Protocol (SIP), is to use a Session Description Protocol (SDP) offer-answer model to agree on a codec. In this model, the first of the communications devices sends an offer message to the second of the communications devices. This offer message will list all of the codecs which the first device is able to communicate using (i.e. the codecs that are available to that communications device or that are compatible with the communications device). The offer message is passed through a network to the second device. The second device, upon receiving the offer message, will determine which (if any) of the offered codecs in the offer message are compatible with the second device, i.e. whether there are any codecs which are mutually compatible. A response is then sent from the second device back to the first. The response will either accept the offer and specify one or more mutually compatible codecs selected from those offered; or will reject (through e.g. the use of a 488 "Not acceptable here" message) the offer message because none of the offered codecs are compatible with the second device. This process enables a mutually compatible codec to be identified (if one exists) to be used in the communications session.

However, in some cases, the two communications devices do not share a common codec. Consequently, transcoding hardware (such as a media gateway) may be used in the network at a point along the communication path between the two communications devices. A transcoder works by receiving communications, encoded using a first codec, from a first communications device, transcoding the communications so that they are encoded using a second codec, and sending the result on to the second communications device. The transcoder may equally transcode communications sent along a return path; i.e. the transcoder is able to transcode from the second codec to the first. As such a transcoder comprises, in itself, one or more codecs to enable this transcoding. The transcoder therefore enables two communications devices to communicate where they would not otherwise be able to.

One method of setting up a communications session when a transcoder is available in a network is to send an offer message from a first communications device to a second communications device through a network. The offer message initially lists all the codecs available to the first communications device. As the offer message is passed through the network, any network node having a transcoding resource modifies the offered list of codecs to include any codecs which can be made available if the transcoding resource is used. As a result, when the offer message reaches the recipient device, the list of available codecs is greatly expanded. The recipient device may then select any of the offered codecs, including those codecs which require transcoding.

One problem with such an arrangement is that it increases the probability of a transcoder being used, even when there is a commonly available codec (i.e. the use of the transcoding resource was not essential for the session to be set up). This is a problem since transcoding resources require substantial processing power, and consequently are a limited resource in a network.

One known method of overcoming this problem is to use a retry system. In this system a first offer message is sent from the first communications device to the second communications device through the network. This first offer message lists codecs compatible with the first device, and is left unmodified by any network node it passes through, even if that node has a transcoding resource available. The second device receives the unmodified offer message, and determines whether there are any mutually compatible codecs. If there are no mutually compatible codecs, then the second device rejects the offer message.

The rejection message is passed back through the network towards the first device. However, when this rejection notice is received at a network node having a transcoding resource, the network node does not pass on the rejection message, but instead sends a second offer message. This second offer message includes any further codecs which are available should the transcoding resource be used. This second, modified, offer message is then received at the second communications device, which may accept any of the transcoded codecs in the usual fashion.

Therefore, the probability of establishing a communications session is increased, and the use of transcoders is limited to situations where one is required.

The problems with the two prior art systems described above is that, in one case, transcoders are overused, in a manner which is wasteful of network resources; in the other case, transcoders are only used if necessary, but may result in an unsuitable codec being selected, where superior communications would have been available should a transcoder have been used.

SUMMARY

In accordance with at least one embodiment, methods, devices, systems and software are provided for supporting or implementing functionality to provide for the selection of codecs in a communications system.

According to a first aspect there is provided a method of selecting a codec for use by a communications device having a connection to a network apparatus, the communications device being configured so as to be able to communicate using any one of a plurality of codecs during a communications session, wherein the network apparatus comprises at least one transcoding resource configured to transcode communications within the network, and wherein the network apparatus is configured such that the transcoding resource can be selectively made available to the communications session, the method comprising determining if the transcoding resource is available for the communications session; determining at least one operative condition affecting said communications device; selecting, if the transcoding resource is available, a subset of the plurality of codecs based on the at least one operative condition; conducting a signalling process whereby to establish a communications session, wherein said signalling process comprises using said subset to determine a codec for use during said communications session.

According to a second aspect there is provided apparatus for selecting a codec for use by a communications device having a connection to a network apparatus with a processor, the communications device being configured so as to be able to communicate using any one of a plurality of codecs during a communications session, and the network apparatus comprising at least one transcoding resource configured to transcode communications within the network, and being configured such that the transcoding resource can be selectively made available to the communications session, the processor configured to determine if the transcoding resource is available for the communications session; determine at least one operative condition affecting said communications device; select, if the transcoding resource is available, a subset of the plurality of codecs based on the at least one operative condition; conduct a signalling process whereby to establish a communications session, wherein said signalling process comprises using said subset to determine a codec for use during said communications session for communications over at least said connection.

According to a third aspect there is provided a computer program product comprising a non-transitory computer-readable storage medium having computer readable instructions stored thereon, the computer readable instructions being executable by a computerized device to cause the computerized device to perform a method of selecting a codec for use by a communications device having a connection to a network apparatus, the communications device being configured so as to be able to communicate using any one of a plurality of codecs during a communications session, wherein the network apparatus comprises at least one transcoding resource configured to transcode communications within the network, and wherein the network apparatus is configured such that the transcoding resource can be selectively made available to the communications session, the method comprising determining if the transcoding resource is available for the communications session; determining at least one operative condition affecting said communications device; selecting, if the transcoding resource is available, a subset of the plurality of codecs based on the at least one operative condition; conducting a signalling process whereby to establish a communications session, wherein said signalling process comprises using said subset to determine a codec for use during said communications session.

Further features and advantages will become apparent from the following description of embodiments, given by way of example only, which is made with reference to the accompanying drawings.

BRIEF DESCRIPTION OF THE DRAWINGS

A communications system will now be described as an embodiment, by way of example only, with reference to the accompanying figures in which.

Several parts and components appear in more than one Figure; for the sake of clarity the same reference numeral will be used to refer to the same part and component in all of the Figures.

DETAILED DESCRIPTION

Figure 1:
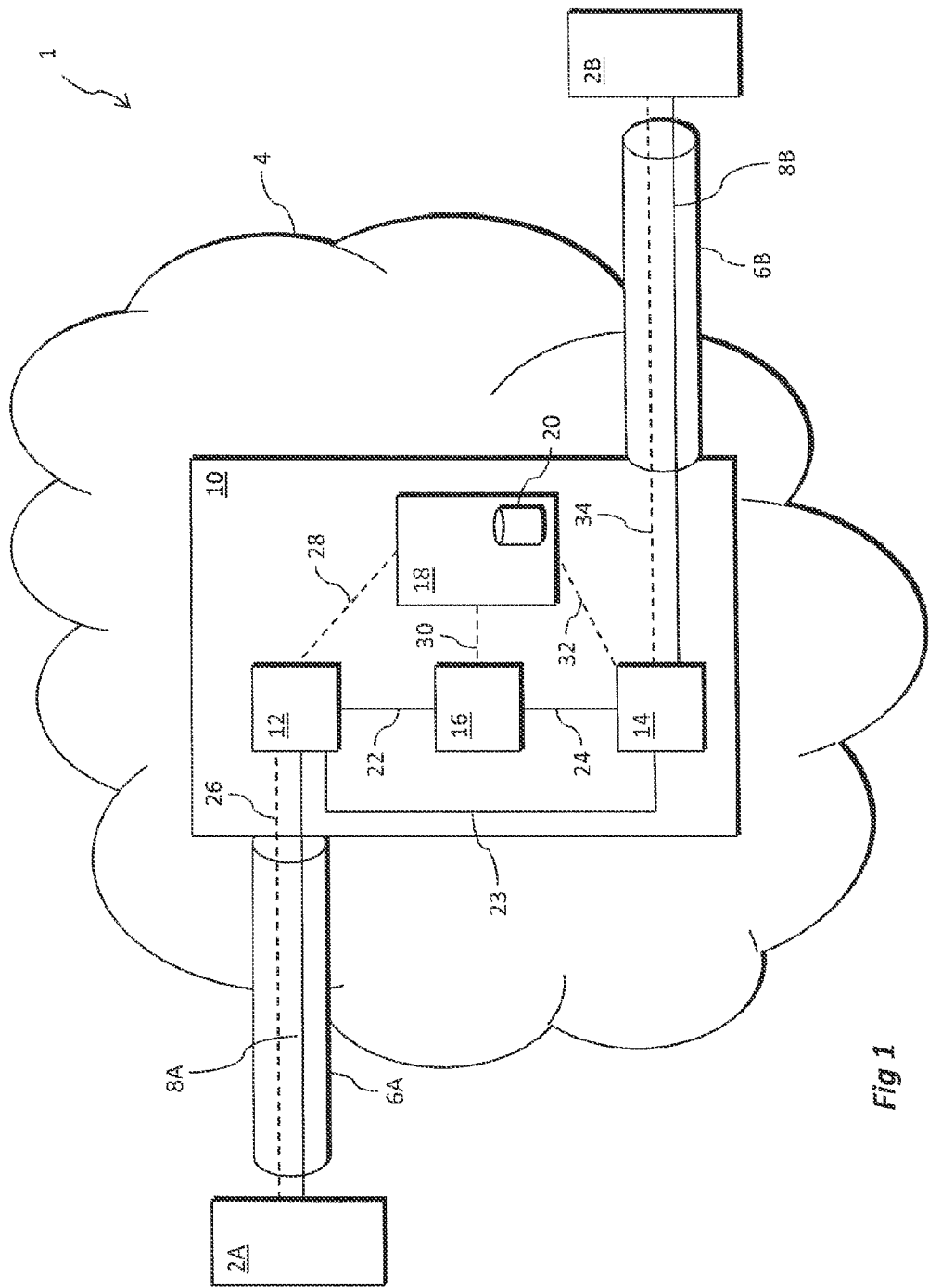
FIG. 1 shows a schematic diagram of a communications system in which embodiments may be used.

Prior to a detailed description of embodiments referencing the Figures, some embodiments will be described in summary form.

According to a first embodiment there is provided a method of selecting a codec for use by a communications device having a connection to a network apparatus, the communications device being configured so as to be able to communicate using any one of a plurality of codecs during a communications session, wherein the network apparatus comprises at least one transcoding resource configured to transcode communications within the network, and wherein the network apparatus is configured such that the transcoding resource can be selectively made available to the communications session, the method comprising: determining if the transcoding resource is available for the communications session; determining at least one operative condition affecting said communications device; selecting, if the transcoding resource is available, a subset of the plurality of codecs based on the at least one operative condition; conducting a signalling process whereby to establish a communications session, wherein said signalling process comprises using said subset to determine a codec for use during said communications session.

By selecting only a subset of the available codecs, the method ensures that, as far as communications to and from that communications device are concerned, only one of the subset of codecs is used, and therefore the codec will be suitable to the situation at the communications device. Moreover, by selecting a subset of codecs, the chances of establishing a link are not reduced, since if a further device in the communications session is unable to use any of the offered codecs, a network transcoder will be employed to transcode the communications, to enable a session to be established.

The network apparatus has a transcoding resource which may be made available selectively, for instance only when two communications devices do not have a common codec. Moreover, by selecting only a subset of the codecs, the method forces the use of the transcoder, to ensure that the codec used by the communications device is appropriate for the conditions.

The availability of the transcoding resource may be limited, either through load management, or through profile information relating to the communications device. Since, if transcoding is not available, the method described above will increase the chances of a session failing to be established, the method may determine the availability of the transcoder before selecting a subset of the codecs. In other words, if the transcoder is not available, a full list of codecs may be sent to maximise the chances of establishing a session with a common codec.

The communications session may be held between the said communications device and a second communications device having a second connection to the network apparatus, the communications session being conducted via a first link established through the said connection and a second link established through the said second connection.

The method may comprise retrieving profile information associated with one or both of the communications devices, said profile information containing data indicative of whether the respective communications device is entitled to use the transcoding resource, whereby to determine if the transcoding element is available for the communications session. The method may comprise retrieving transcoding resource capacity information indicative of whether the transcoding resource has sufficient capacity to be available to the communications session, whereby to determine if the transcoding resource is available for the communications session.

The method may comprise sending an offer to establish the communications session, the offer comprising data indicating that any of said subset of codecs are available for use during the communications session, whereby to conduct said signalling process. The offer may be sent to the second communications device and the method may comprise: receiving a rejection response from the second communications device; identifying an extended list of codecs, the extended list identifying codecs which may be used with the second link if the transcoding resource is made available to the communications session; and transmitting a second offer to the further communications device, the second offer comprising data indicating that any of said extended list of codecs are available for use with the second link during the communications session.

It will be apparent that by limiting the number of codecs offered in an offer message, the chances of finding a common codec are reduced. However, by operating the method in a network in which the network apparatus is arranged to make a second offer (in case of a reject message, the reject message indicating that there are no common codecs) the probability of establishing a session is not reduced, since the second offer (containing transcoded codecs) will ensure that a session is established if at all possible, with transcoding being provided to enable the session to exist between the communications devices.

The method may comprise establishing the communications session such that one of the subset of codecs are used with the first link, and one of the codecs of the extended list of codecs are used with the second link. As such, the method enables a session to be established where transcoding is used.

The method may comprise receiving an offer to establish a communications session, the offer comprising data indicating that any of an offered selection of codecs are available for use during the session; determining if any of said offered selection of codecs correspond to any of the codecs within the subset of codecs; accepting the offer if any of said offered selection of codecs correspond to any of the codecs within the subset of codecs; and rejecting the offer if none of said offered selection of codecs correspond to any of the codecs within the subset of codecs, whereby to conduct said signalling process.

The subset may be used to select codecs to send in an offer, however it may equally be used upon receipt of an offer. That is, the offer is rejected if none of the codecs offered are suitable for the conditions.

The network apparatus may be configured, upon receipt of a rejection, to identify an extended list of codecs, the extended list identifying codecs which may be used with the second link if the transcoding resource is made available to the communications session, and the method may comprise: receiving a further offer to establish a communications session from the network apparatus, the further offer comprising data indicating that any of said extended list of codecs are available for use with the first link.

In line with the above, once a offer is rejected, the network apparatus may provide a second offer with transcoded codecs, so that the session may be established with a codec suitable for the conditions.

The at least one operative condition affecting said communications device may comprise one or more of: a number of dropped packets over the connection; a bandwidth of the connection; a communications protocol used for the connection; a quality of service parameter of the connection; and a measure of the availability of processing resources in the communications device.

The operative condition, based on which the suitability of a given codec is determined, may be one of any number of conditions, some of which are listed above.

The method may comprise conducting signalling whereby to determining at least one operative condition affecting said communications device.

The method may include signalling to determine the operative condition, for example a speed test or quality test could be conducted on the connection.

The network apparatus may comprise a plurality of network nodes.

As will be apparent, the network apparatus may be comprise separate nodes potentially at separate sites, where each node may have one or more specific functions. For example, the network may be arranged to have a dedicated transcoding node. Equally, the network may be arranged with routing nodes which may selectively route communications via the transcoding node to enable the selection of the transcoding node and thus the transcoding resources. Control nodes and policy nodes may equally be provided within the network apparatus.

The method may comprise selecting the subset of codecs at the communications device. Alternatively the method may comprise selecting the subset of codecs at the network apparatus.

The communications device, i.e. the device making an offer or receiving an offer may select the subset of codecs. However, it is also possible for the network apparatus to select the subset. The latter may be done to ensure stricter controls over e.g. the network policy, so that the transcoding resources are suitably used. The selection of codecs may be performed in a control node in a core network area of the network apparatus, or by a node configured to serve the communications device, for example a node which is part of a radio access network or access point.

The method may comprise: receiving an offer to establish a communications session, the offer comprising data indicating that any of an offered selection of codecs are available for use during the session; and modifying the offer based on the selected subset of codecs.

If the network apparatus identifies the subset, then it may subsequently modify any offer being transmitted through the network to reflect this subset, by, for example, removing all codecs in the offer which are not in the subset.

According to a second embodiment there is provided apparatus for selecting a codec for use by a communications device having a connection to a network apparatus, the communications device being configured so as to be able to communicate using any one of a plurality of codecs during a communications session, and the network apparatus comprising at least one transcoding resource configured to transcode communications within the network, and being configured such that the transcoding resource can be selectively made available to the communications session, the apparatus configured to: determine if the transcoding resource is available for the communications session; determine at least one operative condition affecting said communications device; select, if the transcoding resource is available, a subset of the plurality of codecs based on the at least one operative condition; conduct a signalling process whereby to establish a communications session, wherein said signalling process comprises using said subset to determine a codec for use during said communications session for communications over at least said connection.

The communications session may be held between the said communications device and a second communications device having a second connection to the network apparatus, the communications session being conducted via a first link established through the said connection and a second link established through the said second connection.

The apparatus may be configured to retrieve profile information associated with one or both of the communications devices, said profile information containing data indicative of whether the respective communications device is entitled to use the transcoding resource, whereby to determine if the transcoding element is available for the communications session. The apparatus may be configured to retrieve transcoding resource capacity information indicative of whether the transcoding resource has sufficient capacity to be available to the communications session, whereby to determine if the transcoding resource is available for the communications session.

The apparatus may be configured to: send an offer to establish the communications session, the offer comprising data indicating that any of said subset of codecs are available for use during the communications session, whereby to conduct said signalling process.

The apparatus may be configured to: receive an offer to establish a communications session, the offer comprising data indicating that any of an offered selection of codecs are available for use during the session; determine if any of said offered selection of codecs correspond to any of the codecs within the subset of codecs; accept the offer if any of said offered selection of codecs correspond to any of the codecs within the subset of codecs; and reject the offer if none of said offered selection of codecs correspond to any of the codecs within the subset of codecs, whereby to conduct said signalling process.

The network apparatus may be configured, upon receipt of a rejection, to identify an extended list of codecs, the extended list identifying codecs which may be used with the second link if the transcoding resource is made available to the communications session, and the apparatus may be configured to: receive a further offer to establish a communications session from the network apparatus, the further offer comprising data indicating that any of said extended list of codecs are available for use with the first link.

The at least one operative condition affecting said communications device may comprise: a number of dropped packets over the connection; a bandwidth of the connection a communications protocol used for the connection; a quality of service parameter of the connection; and a measure of the availability of processing resources in the communications device.

The apparatus may be configured to: conduct signalling whereby to determining at least one operative condition affecting said communications device.

According to a third embodiment there is provided a communications device comprising an apparatus for selecting a codec for use by a communications device having a connection to a network apparatus, the communications device being configured so as to be able to communicate using any one of a plurality of codecs during a communications session, and the network apparatus comprising at least one transcoding resource configured to transcode communications within the network, and being configured such that the transcoding resource can be selectively made available to the communications session, the apparatus configured to: determine if the transcoding resource is available for the communications session; determine at least one operative condition affecting said communications device; select, if the transcoding resource is available, a subset of the plurality of codecs based on the at least one operative condition; conduct a signalling process whereby to establish a communications session, wherein said signalling process comprises using said subset to determine a codec for use during said communications session for communications over at least said connection.

According to a fourth embodiment there is provided a network node comprising an apparatus for selecting a codec for use by a communications device having a connection to a network apparatus, the communications device being configured so as to be able to communicate using any one of a plurality of codecs during a communications session, and the network apparatus comprising at least one transcoding resource configured to transcode communications within the network, and being configured such that the transcoding resource can be selectively made available to the communications session, the apparatus configured to: determine if the transcoding resource is available for the communications session; determine at least one operative condition affecting said communications device; select, if the transcoding resource is available, a subset of the plurality of codecs based on the at least one operative condition; conduct a signalling process whereby to establish a communications session, wherein said signalling process comprises using said subset to determine a codec for use during said communications session for communications over at least said connection.

In the network node the apparatus may be configured to: receive an offer to establish a communications session, the offer comprising data indicating that any of an offered selection of codecs are available for use during the session; and modify the offer based on the selected subset of codecs.

According to a fifth embodiment there is provided a communications system comprising an apparatus for selecting a codec for use by a communications device having a connection to a network apparatus, the communications device being configured so as to be able to communicate using any one of a plurality of codecs during a communications session, and the network apparatus comprising at least one transcoding resource configured to transcode communications within the network, and being configured such that the transcoding resource can be selectively made available to the communications session, the apparatus configured to: determine if the transcoding resource is available for the communications session; determine at least one operative condition affecting said communications device; select, if the transcoding resource is available, a subset of the plurality of codecs based on the at least one operative condition; conduct a signalling process whereby to establish a communications session, wherein said signalling process comprises using said subset to determine a codec for use during said communications session for communications over at least said connection.

The communications system may also include the network apparatus as described in the claims, that is an apparatus configured to forward offer messages to communications devices and to make a second offer comprising transcoded codecs if a first offer is rejected by any given communications device.

According to a sixth embodiment there is provided a communications system comprising a plurality of communication devices, each being configured so as to be able to communicate using any one of a plurality of codecs during a communications session, and each connected to a network apparatus, the network apparatus comprising at least one transcoding resource configured to transcode communications within the network, and the network apparatus being configured such that the transcoding resource can be selectively made available to the communications session, the communications devices and network apparatus collectively configured to perform a method of selecting a codec for use by the communications device, the method comprising: determining if the transcoding resource is available for the communications session; determining at least one operative condition affecting said communications device; selecting, if the transcoding resource is available, a subset of the plurality of codecs based on the at least one operative condition; conducting a signalling process whereby to establish a communications session, wherein said signalling process comprises using said subset to determine a codec for use during said communications session.

According to a seventh embodiment there is provided a computer program product comprising a non-transitory computer-readable storage medium having computer readable instructions stored thereon, the computer readable instructions being executable by a computerized device to cause the computerized device to perform a method of selecting a codec for use by a communications device having a connection to a network apparatus, the communications device being configured so as to be able to communicate using any one of a plurality of codecs during a communications session, wherein the network apparatus comprises at least one transcoding resource configured to transcode communications within the network, and wherein the network apparatus is configured such that the transcoding resource can be selectively made available to the communications session, the method comprising: determining if the transcoding resource is available for the communications session; determining at least one operative condition affecting said communications device; selecting, if the transcoding resource is available, a subset of the plurality of codecs based on the at least one operative condition; conducting a signalling process whereby to establish a communications session, wherein said signalling process comprises using said subset to determine a codec for use during said communications session.

Embodiments may be provided as software to suitable communications devices, facilitating the introduction of the such embodiments to current systems.

A communications system, in which embodiments may operate, will now be described with reference to FIG. 1.

FIG. 1 shows a schematic diagram of a communications system 1. Within the communications system 1 are first and second communications devices 2A and 2B. These communications devices are each configured with multiple codecs (through hardware, software, or a combination of the two) capable of encoding and/or decoding a data which is sent from and/or received by the communications device. The communications devices may be configured with different codecs (as will be described in more detail below). The communications devices may operate so as to select one of the configured codecs for communications to and from the communications device, this selection involving selecting and utilizing hardware and/or software within the communications device to encode and decode the communications.

The communications devices are both connected to network apparatus 10 within the network 4. The connections between the communications devices and the network apparatus 10 are represented schematically by tubes 6A and 6B. Each connection has an associated set of properties, such as protocol, bandwidth, connection quality and the like which will be discussed in more detail later.

While in some embodiments the connections may be stable (i.e. through a fixed line connection) in other embodiments the connections may be more transient, i.e. between a mobile communications device and a radio access network. In this latter case, the connections 6A and 6B may be taken to encompass not only a given instantaneous connection with the network apparatus 10, but also any subsequent connections which may develop as a result of handover between access points, radio access networks or similar.

The network apparatus 10 as shown is encompasses a number of network nodes or functions, which may be distributed over a large number of sites. For simplicity, a limited number of the nodes within the network apparatus will be described. As such, in FIG. 1, the network apparatus 10 contains four interconnected network nodes or network entities (the connections within the network apparatus are not shown). Of these nodes, nodes 12 and 14 enable communications to be routed through the network; node 16 is able to transcode communications passing through it; and controlling node 18, which may contain a database 20, provides control over the communications.

In use, a communications session may be established between the first communications device 2A and the second communications device 2B. To enable the communications session to be established, signalling links may be established between the entities in the communications system. In FIG. 1, the signalling links are shown as dashed lines. Signalling links 28, 30 and 32 are shown as being established between the controlling node 18, and nodes 12, 16, and 14 respectively. In addition, signalling link 26 is established between communications device 2A and node 12, and signalling link 34 is established between communications device 2B and node 14. Signals sent from e.g. the communications device 2A may be forwarded to the control node 18 via the node 12.

By signalling over these signalling links, communications links are established through the network to enable the session to be established between the communications devices 2A and 2B. In FIG. 1, the communications links are shown as solid lines. Two of these communications links are represented by lines 8A (between communications device 2A and network node 12) and 8B (between node 14 and communications device 2B). Equally, a communications link or communications links may be established in one of two ways between nodes 12 and 14. The first way is represented by lines 22 (between node 12 and node 16) and 24 (between node 16 and 14). The second way is represented by line 23, directly between node 12 and 14. As will be described later, the choice of which path to use will depend on whether transcoding is required during the session. During a session, data may be transmitted and/or received over these links.

The control entity 18 may further retrieve profile and network resource data from the database 20 to assist in the establishment of the communications session (as will be described in more detail below).

It will be understood that the connections described in FIG. 1 are distinct from the signalling links and communication links. In particular a connection exists on a lower communications layer to a link. Connections may exist between any two entities (with only the connections between the communications devices and the network apparatus 10 being shown in FIG. 1).

It will further be apparent that the communications system shown in FIG. 1 is a simplification. As such any network in which embodiments may operate may be substantially more complex, with many more network entities. Moreover, the network nodes have been described in terms of their function, and may therefore bear no resemblance to any physical entity in embodiments. The functions of one or more of the entities described may be combined into one entity. Equally, at least some of the functionality of any entity (and in particular the control node 18) may be distributed over any of the other entities.

Figure 2:
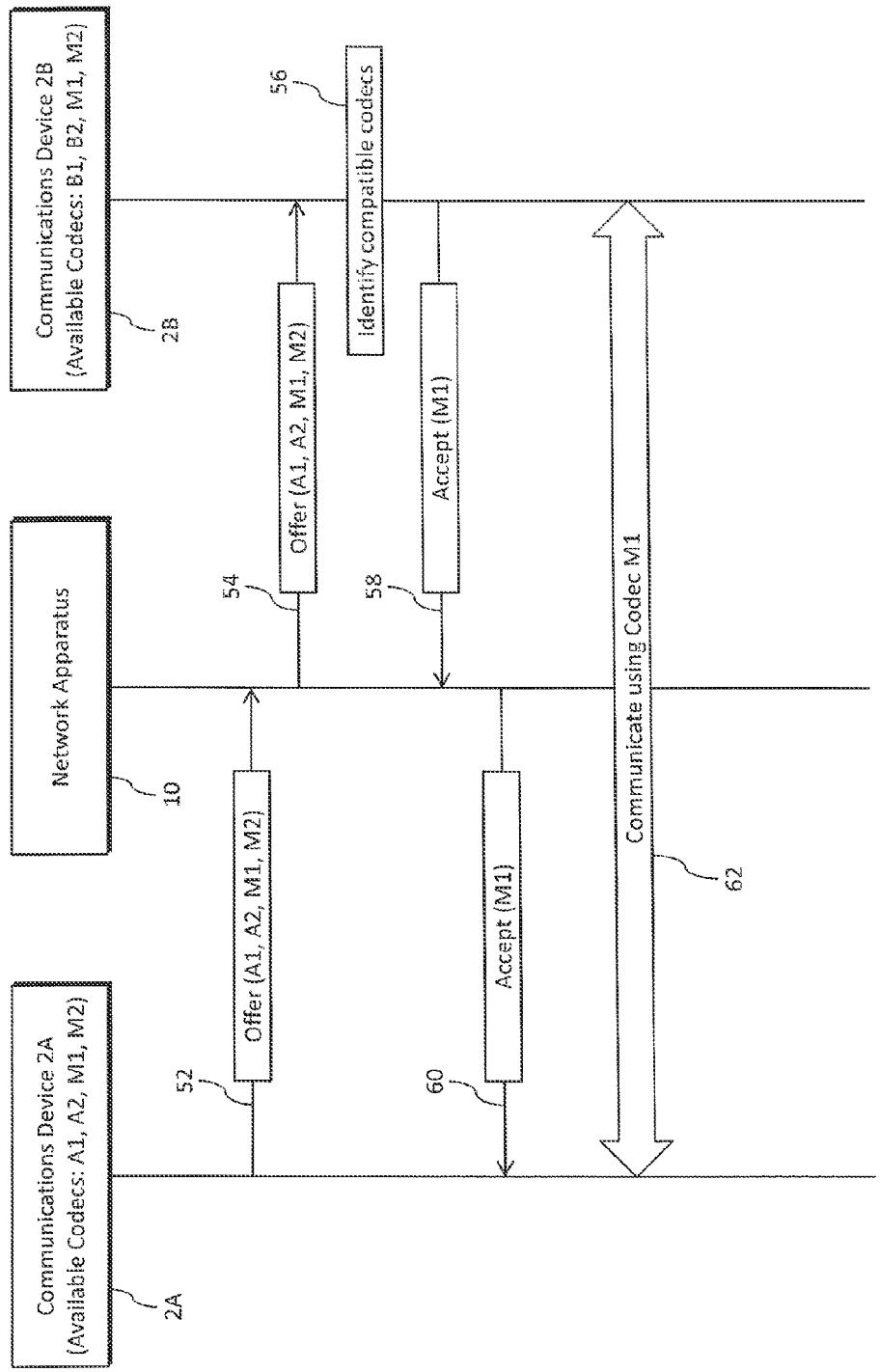
FIG. 2 shows a signalling flow to select a codec for a session where there is a mutually compatible codec.

The communication flows associated with selecting a codec according to embodiments will now be described with reference to FIGS. 4 to 7 below. These communications flows may be performed by the elements with communications system 1 described above. Nevertheless, by way of introduction, two known methods of selecting a codec for a session will be described with reference to FIGS. 2 and 3.

In all of the communications flows described below, communications device 2A invites communications device 2B to establish a session. Communications device 2A is able to use a first set of codecs for communications. Communications device 2B is similarly able to use a second set of codecs for communications. Throughout the following description, codecs available only to the first communications device 2A will be given the identifiers A1 and A2; codecs available only to the second communications device 2B will be given the identifiers B1 and B2; Finally, codecs available to both communications devices (i.e. mutually compatible codecs) will be given the identifiers M1 and M2. It will be apparent that these identifiers may represent any codec which may be available for communications. Equally, the number of codecs available to any given communications device is not limited to number described below.

In all of the following communications flows, the signalling prior to the establishment of the session may be performed using the signalling links 26, 28, 30, 32 and 34 described in FIG. 1 above. Once the session is established, the communications associated with the transmitting and receiving of the data may be performed over the communications links 8A 22, 23, 24 and 8B. As described above, the node 16 may provide a transcoding service, consequently when a transcoding service is required, the communications session may be established over links 8A, 22, 24 and 8B, whereas if a transcoding service is not required, the communications session may be established over links 8A, 23 and 8B. The control node 18 may send signals to the nodes 12 and 14 to direct them to route communications accordingly.

Figure 3:
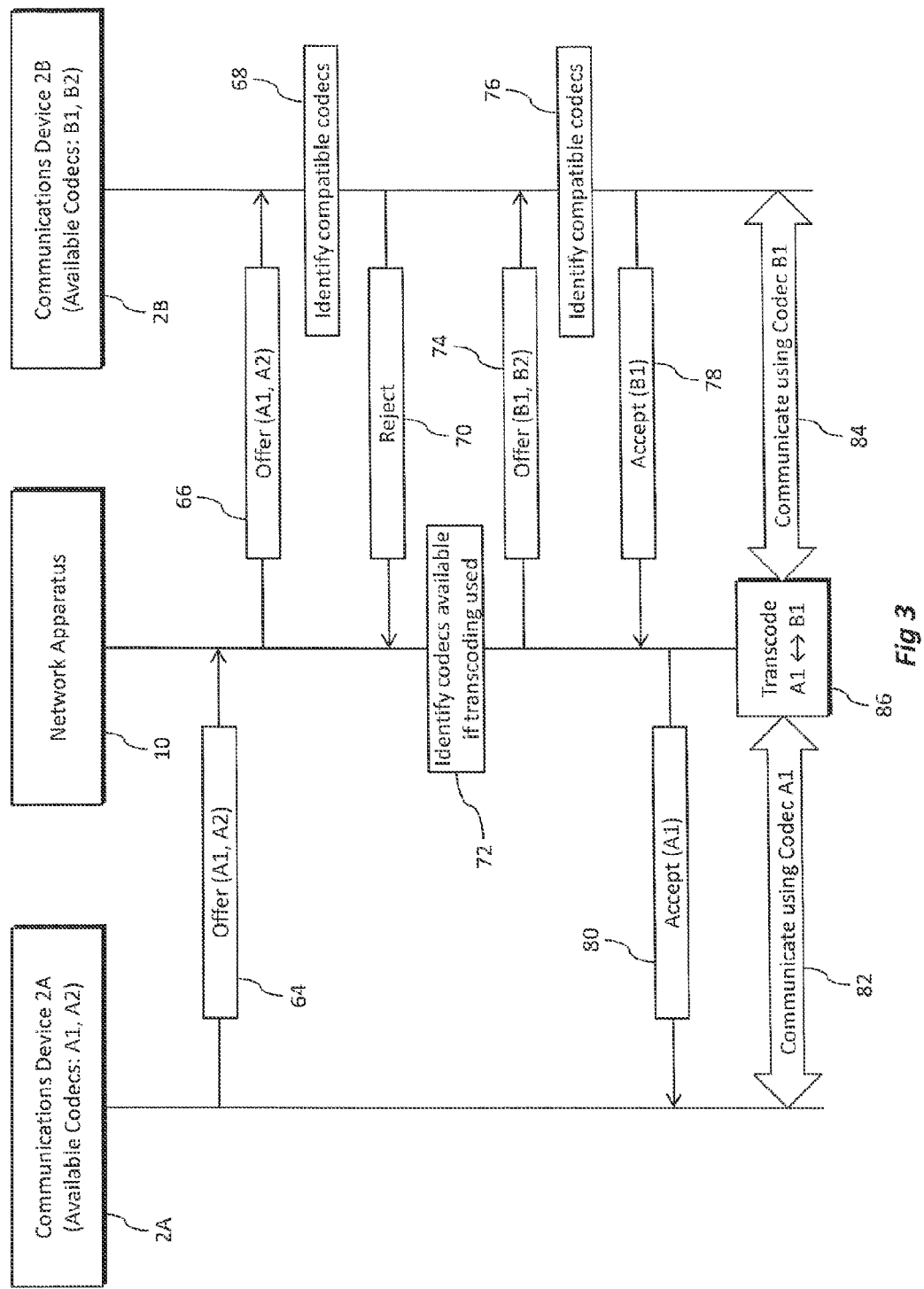
FIG. 3 shows a signalling flow to select a codec for a session where there is no mutually compatible codec.

FIG. 3 represents a possible communications flow when the communications devices have at least one mutually compatible codec (M1 and/or M2). The communications device 2A sends an offer message to the communications device 2B, which, in a first step 52, is sent to the network apparatus 10. This offer message invites the communications device 2B to establish a session with communications device 2A and specifies that the communications device 2A is able to communicate using any of codecs A1, A2, M1 and M2 (as identified in the brackets).

The offer message is forwarded, in step 54, by the network apparatus 10 to the second communications device 2B. In step 56, the communications device 2B determines that it is able to communicate using either of codecs M1 and M2, and accordingly selects one of these mutually compatible codecs.

Subsequently, in step 58, the communications device 2B sends an acceptance message back to the communications device 2A. The acceptance message specifies codec M1 as the codec selected for the session. The acceptance message is sent firstly to the network apparatus 10 in step 58, before being forwarded by the network apparatus 10 to the communications device 2A in step 60.

As a result, a communications session is established between communications device 2A and communications device 2B in which codec M1 is used. This is represented by two way arrow 62, and may involve further signalling as is known in the art.

In embodiments, it may be the case that a mutually compatible codec exists. Therefore a session may be established in a similar way to the above.

FIG. 3 represents the communications flow when the communications devices do not have a mutually compatible codec (i.e. communications device 2A has only codecs A1 and A2 available to it, and communications device 2B has only codecs B1 and B2 available to it).

The communications device 2A sends an offer message to the communications device 2B which, in a first step 64, is sent to the network apparatus 10. This offer message specifies that the communications device 2A is able to communicate using either of codecs A1 or A2 (as identified in the brackets).

The offer message is forwarded, in step 66, by the network apparatus 10 to the second communications device 2B. In step 68, the communications device 2B identifies whether it is able to communicate using any of the codecs offered in the offer message. In this case, there are no mutually compatible codecs, and therefore the communications device 2B has to reject the offer message.

Subsequently, in step 70, the communications device 2B sends a reject message back to the network apparatus 10. In response to receiving the reject message, the network apparatus 10 determines, in step 72, whether any additional codecs may be made available through the use of the transcoder. In this case, the transcoder is able to transcode to/from codecs B1 and B2. Consequently, in step 74, the network apparatus 10 sends a second offer message to the communications device 2B. This second offer message specifies that codecs B1 and B2 are available.

Upon received this second offer message, in step 76, the communications device 2A again identifies if there are any compatible codecs, which in this case are both B1 and B2. Consequently, in step 78, the communications device 2B is able to send an acceptance message to the network apparatus 10 specifying one of codecs B1 or B2 as the basis of this acceptance (in this case, codec B1, as represented in the brackets).

The network apparatus 10, having received an acceptance message, forwards the acceptance message on to the communications device 2A in step 80. However, since transcoding is to be used, the acceptance message sent from the network apparatus 10 to the communications device 2A specifies that one of codecs A1 or A2 have been selected (rather than codec B1 as in the acceptance message 78). In this case codec A1 is selected.

Once the acceptance message 80 is received at the communications device 2A, the establishment of the session can be completed, as represented by arrows 82 and 84 representing the communications between the communications devices and the network apparatus. The communications between communications device 2A and the network apparatus 10 use codec A1, and the communications between communications device 2B and the network apparatus 10 use codec B1. At the network apparatus 10, the transcoder operates to transcode between the codecs A1 and B1, as represented by block 86.

It will be understood that while the above have been described as known methods, embodiments provide improvements over such methods, and consequently any steps described above may be performed within, or as an addition to the methods described below in some embodiments.

The communication flows according to an embodiment will now be described with reference to FIG. 4. As in the process described in FIGS. 2 and 3, a first communications device 2A invites a second communications device to a communications session. Equally, as in the process described in FIG. 3, the first communications device 2A has codecs A1, A2, M1 and M2 available to it, while the second communications device 2B is able to communicate using codecs B1, B2, M1 and M2.

In a first step 88, the communications device 2A determines any operative conditions which may affect the communications device. This can include determining conditions affecting the communications device itself (i.e. internal constraints) as well as conditions affecting the connection 6A. This determination may comprise signalling between the communications device 2A and the network apparatus 10 as shown, however this is not essential. The determining may identify any of a number of aspects, a non limiting set of examples include:
- 1—a quality of the connection 6A, which may be measured, or specified (if managed quality of service is provided);
- 2—the number of dropped packets over connection 6A;
- 3—the bandwidth available over the connection 6A;
- 4—the latency of the connection 6A;
- 5—the stability of the connection, i.e. a measure of the probability that the connection quality will decrease;
- 6—the handover rate for the communications device (if a mobile communications device), this may be used to determine a likelihood of the bandwidth of the connection increasing or decreasing (i.e. through handover to a different radio access technology);
- 7—the processing resources available in the communications device 2A;
- 8—the battery capacity remaining on the communications device 2A; and
- 9—policy or preference information stored on communications device 2A.

It will be apparent that this step 88 may be an ongoing determination, and therefore historic data may be retrieved from a memory to effect this determination. Additionally or alternatively, the communications device may test the connection (i.e. by running a speed test) to determine the bandwidth.

Having determined the conditions affecting the communications in step 88, the communications device 2A, in step 90, selects a subset of the codecs available to it. The codecs available to the communications device include any codec which may be used by the communications device to communicate. The subset therefore includes some, but not all, of these available codecs.

In selecting the subset of codecs, the communications device takes into account the operative conditions as determined in step 88. There are many methods by which this may be done (as will be apparent to the person skilled in the art) however a non limiting set of examples includes:
- 1—selecting only codecs optimised for a high quality of service or optimised for a low quality of service in dependence on the quality of the connection;
- 2—selecting codecs having a high robustness (against lost data) the number of dropped packets is high;
- 3—selecting only low bandwidth codecs if the bandwidth of the connection is low or selecting only high bandwidth codecs if bandwidth of the connection is high;
- 4—selecting codecs with a low encoding/decoding latency if the latency of the connection is high;
- 5—selecting only low quality codecs if there is a high probability that the connection quality will decrease;
- 6—selecting only low bandwidth codecs if the handover rate is high and therefore there is a high probability of handover to a low bandwidth network (even if the current connection is of a high bandwidth);
- 7—selecting codecs which are processor intensive if there are sufficient processing resources on the communications device which may be used to enable the processing of that codec;
- 8—excluding codecs for which dedicated hardware is already in use (i.e. if the codec requires dedicated hardware which is currently being used by another process in the communications device);
- 9—selecting codecs which are not processor intensive if, for example, the processing resources on the communications device are limited (by e.g. there being a large number of background tasks being performed), or if the battery of the communications device is low (the reduced processor usage correlating to reduced battery consumption);
- 10—selecting codecs in dependence on the policy or preference information, including, for example, selecting codecs that put low strain on the network, and/or selecting more codecs at peak time (i.e. when the load on the network is higher).

It will be apparent that the selection of the subset may be to ensure an adequate connection in difficult communications scenarios (i.e. if the connection is of a low quality, having a low bandwidth, low quality, high latency, etc.). Equally the selection of the subset may be to ensure that high quality is used, should the connection and communications device be suited for it. The selection of the subset may additionally or alternatively be governed by policy requirements or preferences.

Having selected the subset of codecs, the communications device sends an offer message to the communications device 2B, which, in a first step 92 is sent to the network apparatus 10. The offer message includes a list of (i.e. offers) the subset of codecs selected in step 90. In this example, the offer message includes codecs A2 and M1, with codecs A1 and M2 being excluded from the subset, despite being available for communications device 2A to use.

In step 94, the offer message is forwarded from the network apparatus 10 to the second communications device 2B. As in step 92, the offer message contains only the subset of codecs and does not contain the excluded codecs.

In step 96, the second communications device 2B determines the conditions affecting itself (i.e. the communications device 2B), and in step 98 selects a subset of codecs based on the available resources. This process is similar to that performed in steps 88 and 90 and therefore the conditions will not be repeated, however it will be understood that the algorithm used to select the subset of codecs may be altered depending on whether the communications device in question is making the offer or receiving it. It will be apparent that the steps 96 and 98 may occur, at least in part, before the receipt of the offer message. That is the communications device 2B may maintain a current subset of codecs, based on a continuous evaluation of the conditions affecting communications.

Having identified the subset of codecs, in step 99, the communications device 2B compares the subset to the codecs offered in the offer message 94, and determines if there are any compatible codecs (i.e. if any codecs are available both in the subset determined for communications device 2B and in the subset offered in the offer message). If a codec is available, then the communications device 2B may send an acceptance message in line with the process described in FIG. 3 and the communications session may be established using this mutually available codec.

However, for the purposes of this example, the subset selected by communications device 2B contains codecs M2 and B2. Consequently, there are no mutually compatible codecs within the subset (despite there being mutually compatible codecs which were excluded from one or other of the subsets). Therefore, in step 100 the communications device 2A sends a rejection message to the network apparatus 10.

Upon receipt of the rejection message, the network apparatus 10 identifies, in step 102, which codecs are available if the transcoder is used. In this case, the transcoder is able to add codecs A1, B1, B2 and M2 to the offer message. It will be apparent that despite codec A1 and M2 being inappropriate for the connection 6A between communications device 2A and the network apparatus 10; it may still be offered as an output of the transcoder.

Subsequently, in step 104, the network apparatus sends a second offer message, including the codecs available through transcoding. In this example, the codecs offered in this second offer message include codecs A1, B1, B2 and M2.

Upon receipt of the second offer message, the second communications device 2B identifies, in step 106, if there are any compatible codecs within the second offer message. To do this, the second device will compare the offered codecs against the subset determined in step 98 previously. In this example, there are two mutually compatible codecs, B2 and M2.

Consequently, in step 108, the communications device 2B sends an acceptance message to the network apparatus. The acceptance message may specify a single codec as the accepted codec, or alternatively may specify all compatible codecs. In this example, the acceptance message identifies both codecs B2 and M2 as accepted codecs.

Upon receipt of the acceptance message, the network apparatus, in step 110, then sends an acceptance message to the communications device 2A; however this second acceptance message specifies one or more codecs which may be used in the communications between the network apparatus 10 and the communications device 2A. In this example, the acceptance message identifies codecs A2 and M1, these being the codecs identified in the original offer (step 92). One of the codecs A2 and M1 will form the input/output of the transcoder.

Therefore a session is established. The first communications device 2A communicates with the network apparatus 10 using one of the codecs identified in the accept message 110, in this case codec A1 (as represented by arrow 112). The second communications device 2B communicates with the network apparatus 10 using one of the codecs identified in the accept message 108, in this case codec B2 (as represented by arrow 114). The network apparatus provides transcoding services, as represented by block 116. Overall the arrows 112, 114 and transcoding service 116 represent the established session. When establishing the session, one of the codecs specified in the accept messages 108 and 110 are selected and used. This selection may be done by the communications devices themselves, or in one or both cases by the network apparatus 10. The selection of the codec to use from the accepted set (where there is more than one acceptable codec) may be done based on a preference or priority basis, or randomly.

In this embodiment both communications devices 2A and 2B select subsets of codecs. However it will be apparent that in alternative embodiments only one of the two devices need select a subset of codecs.

By selecting only a subset of codecs, the communications devices are able to ensure that optimal codecs are used for the communications to and from each communications device. In this regard, optimal, means that the codec is best suited to the communications conditions, and therefore makes best use of the communications resources. Furthermore, the method ensures that the transcoding resources within the network apparatus 10 are only used when there are no compatible, optimal, codecs available.

This above method provides an improved selection of a codec in a situation in which the only mutually compatible codec is a high bandwidth codec, and one or both of the connections 6A and 6B are low bandwidth. In such a situation, a method according to the prior art would select the mutually compatible, high bandwidth, codec, and the quality of the communications would be reduced as a result. By contrast, the above method would select a low bandwidth codec for the low bandwidth connections, with transcoding being used to enable the communications.

The above also provides an improved selection of a codec in a situation in which the only mutually compatible codec is a low bandwidth codec, and both of the connections 6A and 6B are high bandwidth. In such a situation, a method according to the prior art would select the mutually compatible, low bandwidth, codec, and the quality of the communications would be reduced as a result. By contrast, the above method will select two different high bandwidth codecs, with transcoding being performed to enable communications.

As such, the network apparatus does not need to be modified beyond that known in the art. That is, providing the network apparatus is configured to resend an offer message with transcoded codecs (as is available), the steps above will be performed.

The communication flows according to a second embodiment will now be described with reference to FIG. 5. As in the process described in FIG. 4, a first communications device 2A invites a second communications device to a communications session. Equally, as in the process described in FIG. 4, the first communications device 2A has codecs A1, A2, M1 and M2 available to it, while the second communications device 2B has codecs B1, B2, M1 and M2 available to it.

Figure 5:
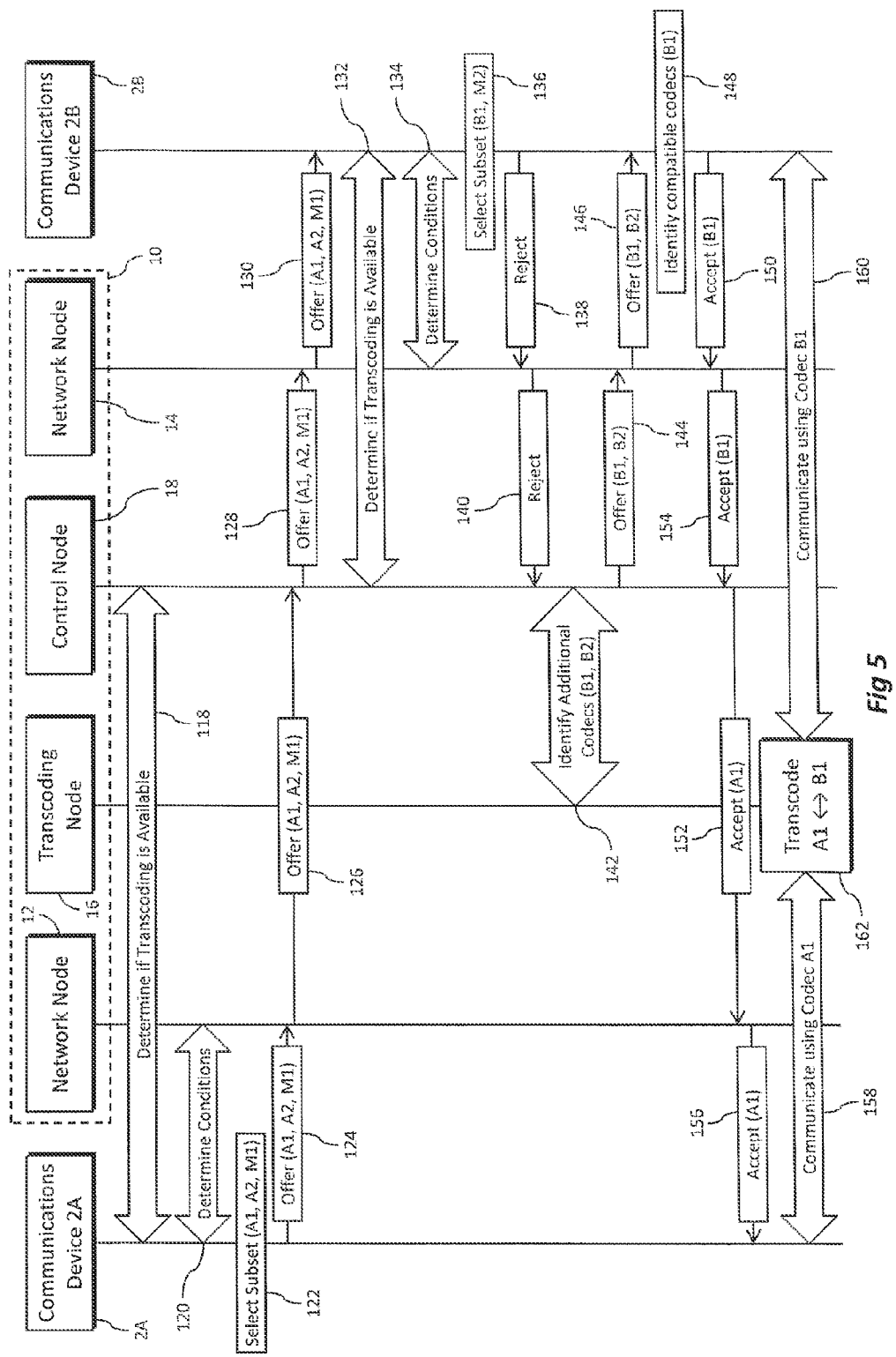
FIG. 5 shows a signalling flow to select a codec according to a second embodiment.

The embodiment shown in FIG. 5 includes explicit reference to the network nodes 12 and 14, as well as the transcoding node 16 and control node 18. These nodes are grouped together as network apparatus 10, represented by the dashed box.

In a first step 118, the communications device 2A determines whether transcoding is available. To do this the communications device 2A may communicate with the control node 18. This communication may be performed using any methods known in the art and will not be described further. Transcoding may be made selectively available, based on any of a number of factors. These include, but are not limited to:

1—Whether the communications device 2A is entitled to use the transcoding resources in the network. This may be a policy decision, based on, for example, whether the communications device is associated with a premium account (i.e. the user of the communications device 2A pays for the use of transcoding services). Any alternative method by which policy data may be used to selectively allow access to transcoding resources will be apparent. The control node 18 may store the user profile associated with the communications device 2A in the database 20.

2—Whether the user of the communications device requests a transcoding service. As such the communications device 2A may present a user with an option, and will only proceed if the user requests transcoding. This enables the user to selectively invoke transcoding (if required) to ensure that an optimal codec is used for important connections.

3—The usage level of the transcoding resources. The control node may be in communication with the transcoding node 16. If transcoding resources are not heavily used, then the control node may inform the communications device 2A that transcoding is available. Alternatively if the transcoding resources are heavily used, then the control node may inform the communications device 2A that transcoding is not available.

In this example, it will be assumed that transcoding resources are available. However, if they are not, then it will be apparent that the signalling flows will proceed (in a similar manner to that described above with reference to FIG. 3) without the selection of subsets as will be described below.

As transcoding is available, the communications device subsequently determines in step 120 what conditions may affect the communications device in a similar manner to step 88 described above with reference to FIG. 4.

Having determined the conditions affecting the communications device, the communications device 2A, in step 122, selects a subset of the codecs available to it. This may be substantially similar to step 90 described above.

Having selected the subset of codecs the communications device sends an offer message to the communications device 2B. In a first step 124, this offer message is sent to the network node 12. As with the offer message sent in step 92, the offer message includes a list of (i.e. offers) the subset of codecs selected in step 122. In this example, the offer message includes codecs A1, A2 and M1, with codec M2 being excluded from the subset, despite being available for communications device 2A to use.

Figure 4:
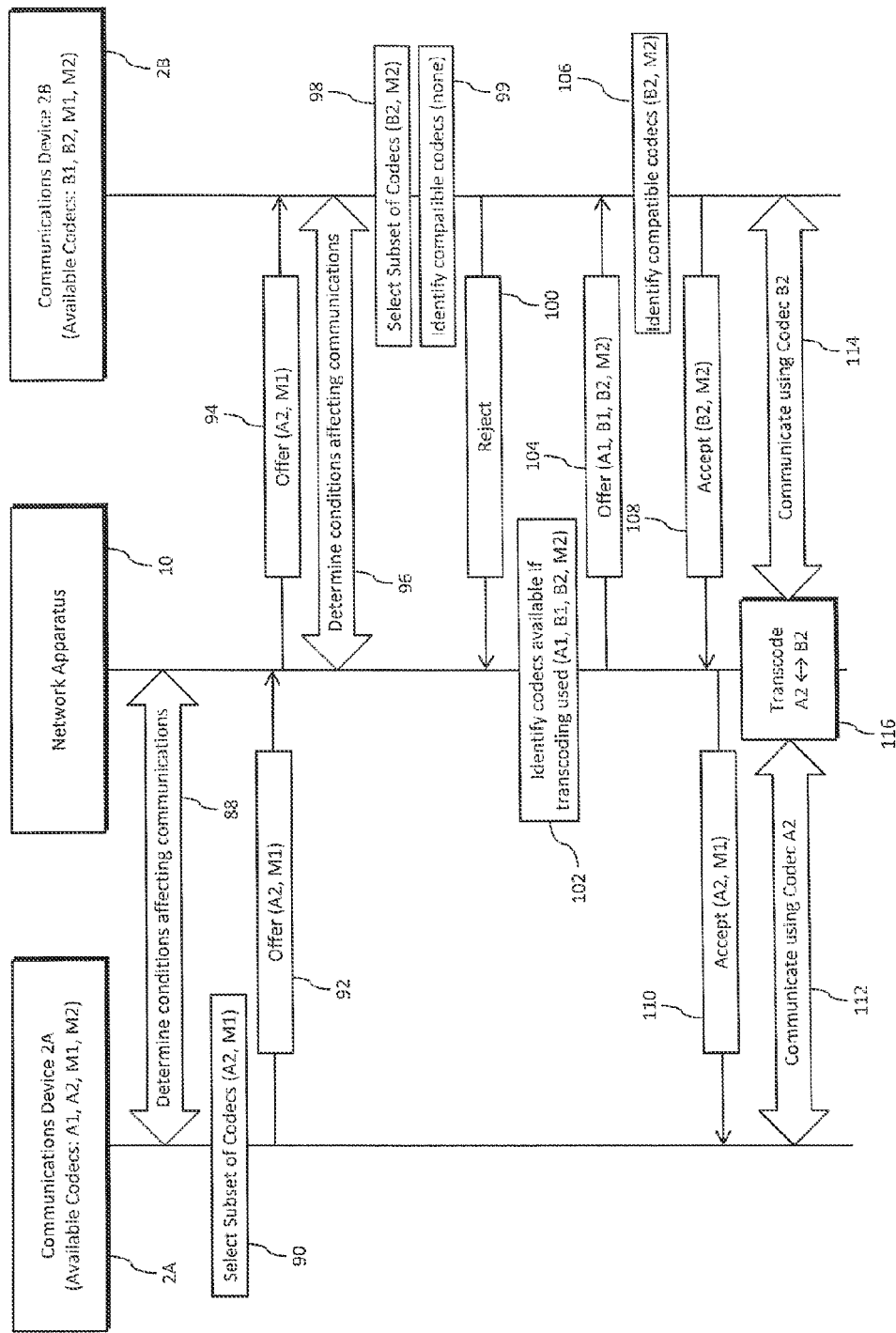
FIG. 4 shows a signalling flow to select a codec according to one embodiment.

The offer message is forwarded through the network, being forwarded by node 12 to the control node 18 (step 126), from the control node 18 to network node 14 (step 128) before being sent to communications device 2B in step 130, this latter step corresponding to step 94 in FIG. 4.

In step 132, having received an offer message, the communications device 2B determines if transcoding is available to it. This may proceed in a similar manner to step 118 above, i.e. the communications device 2B communicates with the control node 18, however the exact process, and algorithm used may be different. Again it is assumed that transcoding is available for communications device 2B. Consequently, in step 134, communications device 2B determines the conditions which may affect communications in a similar manner to step 120 above and step 96 described with reference to FIG. 4. This determination is followed by the selection of a subset of available codecs, as described in step 122 above and in step 98 in FIG. 4. In this case, the subset is selected to contain codecs B1 and M2, and exclude codecs B2 and M1. While not shown, the step of selecting the subset also includes identifying if any of the codecs in the subset are available in the offer message (which in this case there are not). Such a step is analogous to step 99 above.

The following steps proceed in a similar manner to those described above with reference to FIG. 4. A reject message is sent along the return path to the communications device 2A. This reject message is received and forwarded by network node (steps 138 and 140) before being received by the control node 18.

In step 142, the control node communicates with the transcoding node 16 to identify codecs available through transcoding (similar to step 102 in FIG. 4). In this case, these are codecs B1 and B2. The subsequent second offer message (similar to message 104 in FIG. 4) is then sent to the communications device 2B via node 14 in steps 144 and 146.

Upon receipt of the second offer message, the second communications device 2B identifies, in step 148, if there are any compatible codecs within the second offer message. To do this, the second device will compare the offered codecs against the subset determined in step 136 previously. In this example, there is one mutually compatible codec B1.

Consequently the communications device 2B sends an acceptance message to the communications device 2A, specifying codec B1 as the accepted codec. This acceptance message (in step 150) is receive firstly by the node 14 to be forwarded (step 152) to the control node 18. The control node, upon receipt of the acceptance message 154, identifies one or more codecs to send on to the communications device 2A in an acceptance message. As transcoding is to be used, these codecs will be different to that specified in the accept message 154. These codecs will be selected from those originally offered in offer 126 (i.e. codecs A1, A2 and M1). As in FIG. 4 above, the acceptance message may identify all possible codecs, however in this embodiment, the control node 18 is configured to select only one codec (from those originally offered) for the acceptance message. This one codec may be selected based on the codec in the accept message 154, for example it may be selected to be the codec most suited for transcoding with the accepted codec (in this case, A1 is most suited to transcoding with B1). The control node 18, in step 154, then sends an acceptance message to the communications device 2A specifying the identified codec A1 as the accepted codec. This acceptance message is firstly received at network node 12 (step 154) before being forwarded to the communications device 2A in step 156.

In addition, the control node 18 may signal to the network nodes 12 and 14 that transcoding is to be used, therefore that the communications session is to be established via the transcoding node 16. This signalling may be a part of the signalling used described above, or may be separate.

Therefore a session is established, with the first communications device 2A communicating with the transcoder 16 using codec A1 (as represented by arrow 158), and with the second communications device 2B communicating with the transcoder 16 using codec B1 (as represented by arrow 160). The transcoder 16 provides transcoding services, as represented by block 162. Overall the arrows 158, 160 and transcoding service 162 represent the established session.

The communication flows according to a further embodiment will now be described with reference to FIG. 6. As in the process described in FIGS. 4 and 5, a first communications device 2A invites a second communications device to a communications session. Equally, as in the process described in FIG. 4, the first communications device 2A has codecs A1, A2, M1 and M2 available to it, while the second communications device 2B has codecs B1, B2, M1 and M2 available to it.

Figure 6:
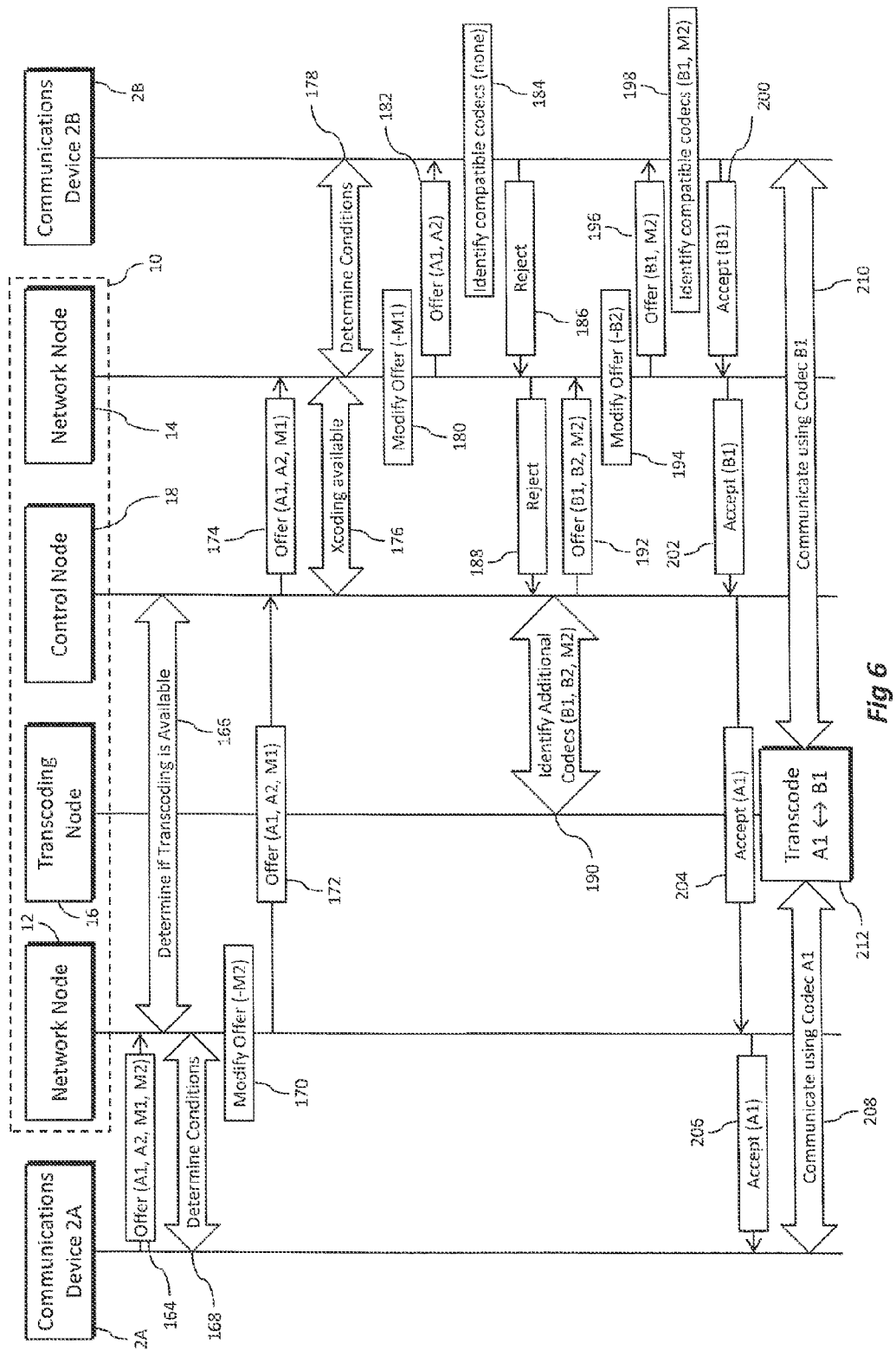
FIG. 6 shows a signalling flow to select a codec according to a further embodiment.

The embodiment shown in FIG. 6 differs from that of FIG. 5 in that the network nodes 12 and 14 are able to modify the offer message, to take into account the conditions affecting the communications device.

Consequently, in a first step 164, the communications device 2A sends an offer message to communications device 2B. This offer message specifies all codecs available to communications device 2A (i.e. the offer message does not contain a subset, but rather the full availability list). The offer message is received by network node 12, which takes on the role of determining the subset appropriate to the communications device 2A.

Therefore, the network node 12 communicates, in step 166, with the control node 18 to determine whether transcoding is available. This nature of the availability of transcoding will be similar to step 118 above, and will not be described again. It will be assumed that transcoding is available.

Therefore, in step 168, the network node determines the conditions which may affect communications by the communications device 2A. This step may include the network node querying the communications device 2A (as shown) to request and receive information on the conditions pertinent to the communications device 2A. Alternatively or additionally the network node 12 may retrieve stored information relating to e.g. the quality of the connection 6A, or may actively test the connection. It will be assumed that as a result of the determination in step 168, it is decided that codec M2 is not appropriate for the connection and/or communications device (represented by "−M2" in brackets)

Therefore, in step 170 the network node 12 modifies the offer message to remove the codec M2 from those offered. In other words, the offer message is modified to contain only the subset of codecs determined by the network node. The modified offer message is then forwarded to the communications device 2B, the first step 172 being transmission to the control node 18, from which it is forwarded to network node 14 in step 174.

Network node 14 then performs a similar process to network node 12. That is, the network node 14, in step 176, communicates with the control node 18 to determine whether transcoding is available to communications device 2B. Subsequently, the network node 14 determines the conditions which may affect communications by the communications device 2B in step 178. This step may proceed in a similar manner to step 168 described above. It will be assumed that as a result of the determination in step 178, it is decided that codec M1 is not appropriate for the connection and/or communications device 2B (represented by "−M1" in brackets).

Therefore, in step 180 the network node 14 modifies the offer message to remove the codec M1 from those offered.

The modified offer message, now offering only codecs A1 and A2, is then forwarded to the communications device 2B in step 182.

In step 184, the communications device 2B, having received an offer message, determines, in step 184, whether it is able to communicate using any of the codecs offered in the offer message. In this regard, the communications device 2B may operate in accordance with the prior art communications devices described above. As previously mentioned, communications device 2B is only able to communicate using codecs B1, B2, M1 and M2 (none of which are offered), therefore the communications device 2B rejects the offer message. This rejection message is sent back along the return communication path to the communications device 2A, as such it is first sent to network node 14 (step 186) to be forwarded to the control node 18 (step 188).

In step 190, the control node (having received a rejection message) identifies codecs available through transcoding (similar to step 142 in FIG. 5), and sends a second offer message. The second offer message (similar to message 144 in FIG. 5) is sent to the communications device 2B via node 14 as offer message 192.

Upon receiving the second offer message, the network node 14 may again, in step 194, check the offer message against the subset of codecs which are appropriate for the communication conditions determined previously in step 178. In this offer message modification step, the codec B2 is deemed unsuitable, and is consequently removed from the offer message. The modified offer message is then sent to the communications device 2B in step 196.

Upon receipt of the second offer message, the second communications device 2B identifies, in step 198, if there are any compatible codecs within the second offer message. In this example, there are two mutually compatible codecs, M2 and B1).

Consequently the communications device 2B sends an acceptance message to the communications device 2A. The communications device 2B may identify all compatible codecs in the acceptance message. However in some embodiments the communications device 2B may select only one codec to accept. In this case, codec B1 is identified in the accept message 200 as the accepted codec. This acceptance message (in step 200) is receive firstly by the node 14 to be forwarded (step 202) to the control node 18. The control node 18, in step 204, then sends an acceptance message to the communications device 2A; however, in a manner similar to the above, the control node 18 determines the codec to accept in the message being sent to the communications device 2A. In this case, this second acceptance message specifies codec A1. This acceptance message is firstly received at network node 12 (step 206) before being forwarded to the communications device 2A in step 208.

Therefore a session is established, with the first communications device 2A communicating with the transcoder 16 using codec A1 (as represented by arrow 208), and with the second communications device 2B communicating with the transcoder 16 using codec B1 (as represented by arrow 210). The transcoder 16 provides transcoding services, as represented by block 212. Overall the arrows 208, 210 and transcoding service 212 represent the established session.

The communication flows according to a further embodiment will now be described with reference to FIG. 7. As in the processes described before, a first communications device 2A invites a second communications device to a communications session. Equally the first communications device 2A has codecs A1, A2, M1 and M2 available to it, while the second communications device 2B has codecs B1, B2, M1 and M2 available to it.

Figure 7:
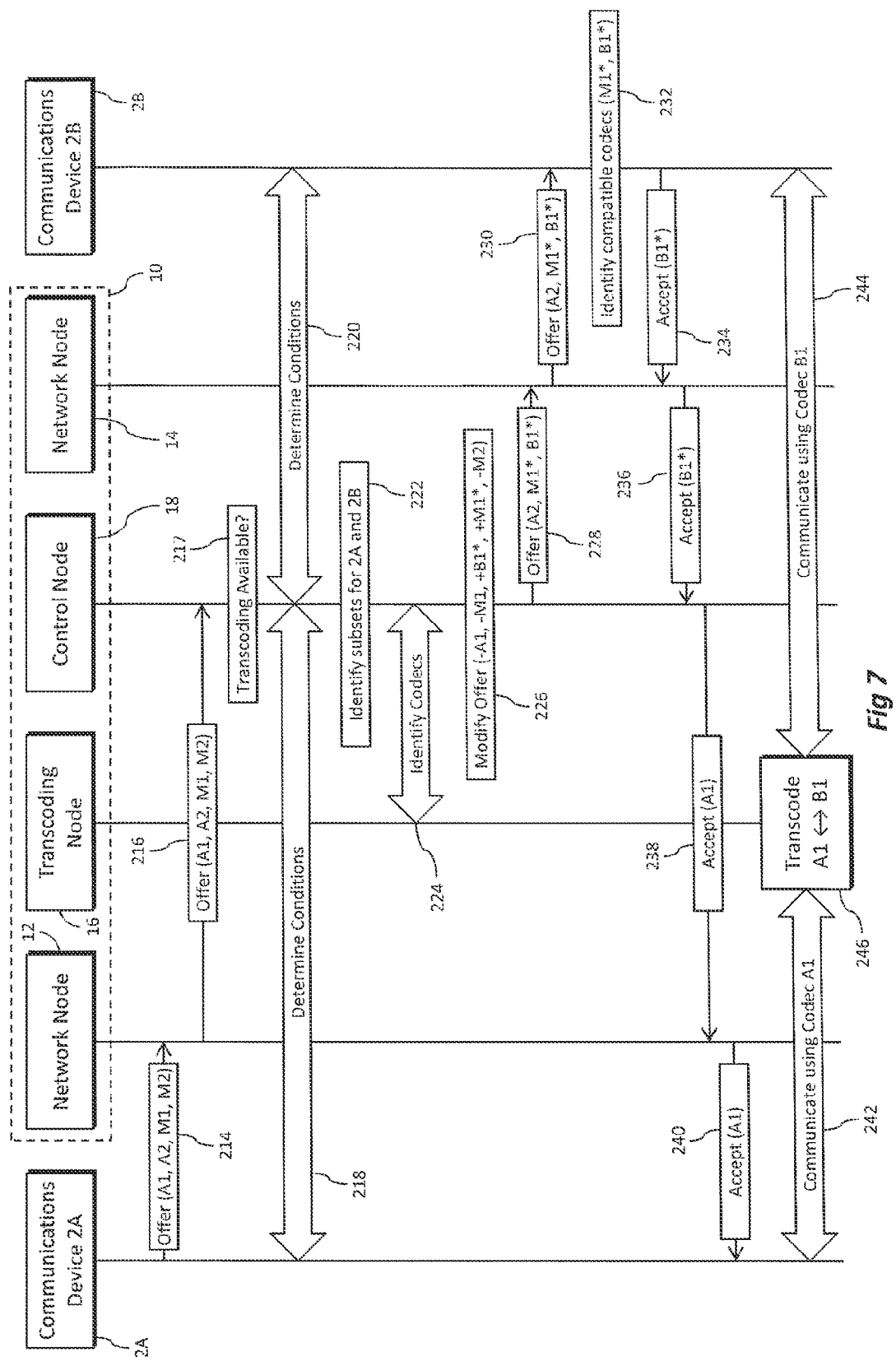
FIG. 7 shows a signalling flow to select a codec according to another embodiment.

The embodiment shown in FIG. 7 differs from that described before in that the control node modifies the offer message to take into account the conditions affecting both communications devices 2A and 2B, as well as the availability of transcoded codecs through the transcoding node.

Firstly, the communications device 2A sends an offer message to communications device 2B. This offer message specifies all codecs available to communications device 2A (i.e. the offer message does not contain a subset, but rather the full availability list). Initially the offer message is sent, in step 214 to node 12. From node 12 the offer message is forwarded, in step 216 to the control node 18.

Upon receiving the offer, the control node 18 may, in step 217, determine whether transcoding is available. This may be done by querying the transcoding node, to determine if there is transcoding capacity. In addition, the control node may retrieve profile information relating to one or both of the communications devices from any profiles stored in the database 20. The determination as to whether transcoding is available is similar to the determinations described above. If transcoding is not available, then the control node may simply forward the offer message on to the communications device 2B as described in e.g. FIG. 2.

The control node then determines the conditions affecting both the communications device 2A and the communications device 2B in steps 218 and 220 respectively. These steps may include communicating directly with the communications devices themselves (as shown), or communicating with the network nodes 12 and 14 connected to the communications devices. The information retrieved may be similar to that determined in e.g. step 88 above.

In step 222, the control node identifies subsets of codecs which are suitable for the communications devices 2A and 2B respectively, in a similar manner to steps 90 and 98 described above.

In an additional step 224, the control node communicates with the transcoding node. In this step the control node determines which codecs may be made available if the transcoder is used. This communication step may involve the control node passing a list of codecs which can be used by the communications device 2A (i.e. those offered in the offer message, modified in view of the subset identified for communications device 2A).

In step 226, the control node 16 then modifies the offer message to:
1—exclude all codecs from the offer message which are not in the subset identified for communications device 2A;
2—add any codec(s) which may be available if the transcoder node 16 is used (these codecs may be the same as some excluded in step 1 above); and
3—exclude any resultant codecs in the offer message which are not in the subset identified for communications device 2B.

In this current example, the subset identified for communications device 2A excludes codecs A1 and M1 (and includes codecs A2 and M2). Therefore codecs A1 and M1 are removed from the offer message (represented by the terms "−A1" and "−M1" in the figure). The transcoder is able to transcode from codecs A2 and/or M2 into codecs B1 and M1, but is not able to transcode into B2. Therefore, codecs B1 and M1 are added to the offer message as transcoded codecs. These are represented as "+B1*" and "+M1*". It is noted that M1 has been re-added, after being removed in the first step.

Finally, codec M2 is not present in the subset for communications device 2B, therefore this codec is removed from the list (represented as "−M2").

The resulting list of codecs in the offer message contains codec A2 as a non-transcoded codec, and codecs M1 and B1 as transcoded codecs. The transcoded codecs are marked with an asterisk, however this is only to signify that they are transcoded codecs added by the control node as opposed to those originally offered in the offer message 216. The modified offer message is then forwarded to network node 14 in step 228, and from there is sent to the communications device 2B in step 230.

In step 232, the communications device 2B identifies any compatible codecs within the list offered in the modified offer message (in this case codecs M1 and B1). The communications device 2B then accepts the offer message, specifying codec B1. The accept message is then sent to communications device 2A. As such, in step 234 the accept message is sent to the network node 14, to be forwarded in step 236 to the control node 18. The control node modifies the accept message to reflect that the communications device will be using codec A1, and sends the modified accept message to the communications device 2A. The accept message is sent firstly, in step 238, to the node 12, from where it is forwarded to the communications device 2A in step 240.

Therefore a session is established, with the first communications device 2A communicating with the transcoder 16 using codec A1 (as represented by arrow 242), and with the second communications device 2B communicating with the transcoder 16 using codec B1 (as represented by arrow 244). The transcoder 16 provides transcoding services, as represented by block 246. Overall the arrows 242, 244 and transcoding service 246 represent the established session.

Additional Details and Modifications

In the description above, the control node 18 is shown as being responsible for many functions, including:
1—the establishment of a session (in terms of identifying a communication path through the network, and determining whether a transcoding resource is to be used);
2—load balancing (if required) on the transcoding node;
3—providing a policy server for the communications devices.

It will be apparent that in some embodiments the functions of the control node may be distributed over a number of different entities, as known in the art of telecommunications, to provide such functionality. For example the policy server functionality may be separate from the session establishment functionality, and consequently, the signalling described above may be adapted such that determinations as to policy (i.e. to determine if transcoding is available to a communications device) involve signalling to the policy server. This may include the control node performing such signalling itself.

While in all the described examples, there is only a single network apparatus, control node etc., it will be apparent that embodiments may be used where two networks are connected. To enable such functionality, the control nodes may communicate between the networks, to e.g. determine if transcoding will be offered. In some embodiments, the profile information (used to determine whether transcoding will be offered) may relate to the network to which one or other of the communications devices are connected. As such, when a session is being established between a communications device in a first network to a communications device in a second network, the appropriate control node may offer transcoding if there is a suitable agreement between the networks, and refuse transcoding if there is no such agreement.

The communications system 1 described above has only been presented with a limited number of elements or nodes. It will be apparent that in any given communications system there may be many more nodes, and consequently there may be additional signalling to determine which of the many nodes any given signal is to be sent to. However this signalling is known in the art, and will not be described in detail.

In the method described in FIGS. 5 to 7, a determination is made as to whether transcoding is available. This is an optional step, and may not be performed. Equally, the method described in FIG. 4 may include the step of determining if transcoding is available. In all embodiments, the determination of whether transcoding is available may be performed without communicating with the control node/network apparatus. For example, the determination may be made based on a stored parameter in the communications devices, or alternatively the communications devices or network nodes (12 and 14) may communicate directly with a transcoding node.

In the methods described in FIGS. 4 to 7, the steps of determining the conditions affecting the communications device and selecting the subset of codecs are performed in response to an offer, or just before an offer is sent. However it will be apparent that these steps can occur at any time prior to point shown in the Figures. The steps may be performed on an ongoing basis such that the subset is continuously re-evaluated as conditions change, irrespective of whether there is a session invite. Alternatively, at least some (but not all) of the functions associated with these steps may be performed earlier, or on a continuous basis (for example, determining the bandwidth of the connection, which may be performed as data associated with another session is received).

The offer message is described as establishing a session, however it will be apparent that embodiments may be used to change a codec used during a session. This may be required when the conditions affecting the communications device change (for example, the bandwidth of the connection drops).

The transcoder node (or transcoding resource) will, itself, contain a number of codecs which will be selected along with the codecs selected for communications with the communications devices. The transcoding node may be a collection of transcoding nodes, each transcoding node able to transcode between different pairs of codecs. As such, the control node may be arranged to select a particular transcoding node based on the identity of the codecs established for the session. The transcoding node may contain a plurality of codecs, each configured to encode and decode from a particular protocol. The transcoder may therefore be configured to selectively connect these different codecs so as to effect the transcoding.

When identifying the subset of codecs, the associated entity may provide the codecs with a preference value (i.e. weighting) or rank the codecs in an order of priority. This preference/priority may be subsequently used to select a codec. For example, the offer message may contain an indication of an order of priority, and when the network apparatus 10 or control entity 18 (as applicable) comes to select a codec for the acceptance message (prior to sending accept message in step 110 in FIG. 4; step 152 of FIG. 5; step 204 of FIG. 6; and step 238 of FIG. 7), the control entity/network apparatus may select the codec with the highest priority. Alternatively, each codec may be provided with an associated weighting or preference value (which may be one of many levels, but equally could be one of only a small number of levels, such as high and low). The control entity/network apparatus may consequently be configured to select a codec with a high preference if possible, but may be able to use internal algorithms to select between all of the high preference codecs should more than one be selectable. Equally, the priority of the subset of codecs determined in the communications device 2B may be used to select a codec for the accept message being sent from the communications device 2B.

The control node 16 or network apparatus 10 (as applicable) may select the codecs to provide in the second offer message (the codecs available as an output from the transcoder) based on the codecs offered by the communications device 2A to ensure compatibility. For example, there may be limits on the pairs of codecs which may be transcoded (for example codecs A1 and B1 may be transcoded, and A2 and B2 may be transcoded, but A1 may not be transcoded to B2 and equally B2 may not be transcoded to A1). Therefore if the offer message received from the communications device 2A does not offer codec A1, then codec B1 is not offered as an output. Additionally, if the offer from communications device 2A offers A1 with a higher priority to A2, then the second offer message may give the transcoded codec B1 a higher priority than B2.

In any particular embodiment, an acceptance message may specify only one, or may specify multiple codecs. For instance, as described in FIG. 4, the communications device 2B may specify more than one codec in the acceptance message. Alternatively as described in FIG. 6, the communications device 2B may identify only one codec in the acceptance message. The acceptance of only one, or of more than one codec is known in the art, as are the subsequent steps for selecting on only one codec (if required). Nevertheless, it will be apparent that no embodiment described above is to be limited to one or other of the described methods.

In some cases, the method as described above may result in failure to establish a communications codec, despite the communications devices having mutually compatible codecs. This would be because the determined subsets (even allowing for transcoding) have no codecs in common. This may occur if the transcoding resource is limited in the codecs which it can transcode between. In such cases, the communications devices and/or the network apparatus may be arranged to establish a session using a non-optimal codec. This may be done by having the communications device 2A send a second offer message (should a reject be received at the communications device 2A) containing all available codecs. Alternatively, the network apparatus may be arranged to include the originally offered codecs in the second offer message. This enables the communications device 2B to accept a previously offered and rejected codec, if this is the best option available in the second offer (and if the alternatively would be to reject the offer for a second time.

While the offer messages have been described above as containing only the identified subset of codecs, it is possible that the offer message could be divided into two sections, preferred and not preferred. Consequently, the network apparatus or control node (as applicable) may be arranged such that a session is established using a preferred codec (and transcoding if required), and only if the session cannot be established using a preferred codec, will a non-preferred codec be used.

In the methods described above, policy information relating to the communications devices may be used to determine the availability of transcoding. In some embodiments, it is possible that the policy information for both parties is used in these determinations. For example, if either of the communications devices are associated with a premium account (as mentioned above) then both communications devices may be allowed to used transcoding in the session between them.

In some embodiments, the signalling used to establish the session is SIP signalling. As such, the nodes described may be one, or a combination of SIP proxies, session border controllers and softswitches as known in the art.

In some embodiments, the communications system may be a mobile communications system operating in accordance with known standards, for example, the UMTS/3G standards. As such, the communications devices 2A and 2B may be mobile communications devices such as mobile phones, smartphones, PDAs, tablets, laptop computers or desktop computers. The network 4 may be a mobile communications network. The network nodes 12 and 14 may represent nodes within the radio access network (RAN), for example a Node-B or a radio network controller (RNC). The controlling node 18 may represent any or a combination of the elements within the core network and the database 20 may represent the HLR, VLR or similar.

However, despite this specific example, it will be apparent that embodiments are not limited to the UMTS/3G standard, and may operate within any suitable communications system. Such communications system may offer a combination of technologies, for example GSM, UMTS, 802.11 (WiFi), PTSN etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A method of selecting a codec for use by a communications device having a connection to a network apparatus, the method comprising:
   determining if at least one transcoding resource within said network apparatus is available for a communications session, the at least one transcoding resource being configured to transcode communications within a network, wherein the network apparatus is configured such that the at least one transcoding resource can be selectively made available to the communications session and wherein the communications session is held between said communications device and a second communications device having a second connection to the network apparatus, the communications session being conducted via a first link established through said connection and a second link established through said second connection;
   determining at least one operative condition affecting said communications device, said communications device being configured so as to be able to communicate using any one of a plurality of codecs during the communications session;
   selecting, if the at least one transcoding resource is available, a subset of the plurality of codecs based on the at least one operative condition; and
   conducting a signaling process whereby to establish the communications session, wherein said signaling process comprises:
      sending an offer to establish the communications session, the offer comprising data indicating that any of said subset of the plurality of codecs are available for use during the communications session, the offer being sent to the second communications device;
      receiving a rejection response from the second communications device;
      identifying an extended list of codecs, the extended list identifying codecs which may be used with the second link if the at least one transcoding resource is made available to the communications session; and
      transmitting a second offer to the second communications device, the second offer comprising data indicating that any of said extended list of codecs are available for use with the second link during the communications session.

2. The method of claim 1, further comprising establishing the communications session such that one of the subset of codecs are used with the first link, and one of the codecs of the extended list of codecs are used with the second link.

3. The method of claim 1, further comprising selecting the subset of codecs at the communications device.

4. The method of claim 1, further comprising selecting the subset of codecs at the network apparatus.

5. The method of claim 4, further comprising:
   receiving an offer to establish a communications session, the offer comprising data indicating that any of an offered selection of codecs are available for use during the session; and
   modifying the offer based on the selected subset of codecs.

6. The method of claim 1, further comprising retrieving profile information associated with one or both of the communications devices, said profile information containing data indicative of whether the respective communications device is entitled to use the transcoding resource, whereby to determine if the transcoding element is available for the communications session.

7. The method of claim 1, further comprising retrieving transcoding resource capacity information indicative of whether the transcoding resource has sufficient capacity to be available to the communications session, whereby to determine if the transcoding resource is available for the communications session.

8. A method of selecting a codec for use by a communications device having a connection to a network apparatus via a first link, the method comprising:
   determining if at least one transcoding resource within said network apparatus is available for a communications session, the at least one transcoding resource being configured to transcode communications within a network, and wherein the network apparatus is configured such that the at least one transcoding resource can be selectively made available to the communications session;
   determining at least one operative condition affecting said communications device, said communications device being configured so as to be able to communicate using any one of a plurality of codecs during the communications session;
   selecting, if the at least one transcoding resource is available, a subset of the plurality of codecs based on the at least one operative condition; and
   conducting a signaling process whereby to establish the communications session, wherein said signaling process comprises:
      receiving an offer to establish the communications session, the offer comprising data indicating that any of an offered selection of codecs are available for use during the communications session;
      determining if any of said offered selection of codecs correspond to any of the codecs within the sub of the plurality of codecs;
      accepting the offer if any of said offered selection of codecs correspond to any of the codecs within the sub of the plurality of codecs; and rejecting the offer if none of said offered selection of codecs correspond to any of the codecs within the subset of the plurality of codecs,
wherein the network apparatus is configured, upon receipt of a rejection, to identify an extended list of codecs, the extended list of codecs which may be used with the first link if the transcoding resource is made available to the communications session, and wherein the method further comprises receiving a further offer to establish the communications session from the network apparatus, the further offer comprising data indicating that any of said extended list of codecs are available for use with the first link.

9. The method of claim 8, further comprising retrieving profile information associated with one or both of the communications devices, said profile information containing data indicative of whether the respective communications device is entitled to use the transcoding resource, whereby to determine if the transcoding element is available for the communications session.

10. The method of claim 8, further comprising retrieving transcoding resource capacity information indicative of whether the transcoding resource has sufficient capacity to be available to the communications session, whereby to determine if the transcoding resource is available for the communications session.

11. The method of claim 8, further comprising selecting the subset of codecs at the communications device.

12. The method of claim 8, further comprising selecting the subset of codecs at the network apparatus.

13. A non-transitory computer-readable storage medium comprising a set of computer executable instructions stored thereon, which, when executed by a processor cause a computerized device to select a codec for use by a communications device having a connection to a network apparatus, comprising:
    determining if at least one transcoding resource within said network apparatus is available for a communications session, the at least one transcoding resource being configured to transcode communications within a network, wherein the network apparatus is configured such that the at least one transcoding resource can be selectively made available to the communications session and wherein the communications session is held between said communications device and a second communications device having a second connection to the network apparatus, the communications session being conducted via a first link established through said connection and a second link established through said second connection;
    determining at least one operative condition affecting said communications device, said communications device being configured so as to be able to communicate using any one of a plurality of codecs during the communications session;
    selecting, if the at least one transcoding resource is available, a subset of the plurality of codecs based on the at least one operative condition; and
    conducting a signaling process whereby to establish the communications session, wherein said signaling process comprises:
        sending an offer to establish the communications session, the offer comprising data indicating that any of said subset of the plurality of codecs are available for use during the communications session, the offer being sent to the second communications device;
        receiving a rejection response from the second communications device;
        identifying an extended list of codecs, the extended list identifying codecs which may be used with the second link if the at least one transcoding resource is made available to the communications session; and
        transmitting a second offer to the second communications device, the second offer comprising data indicating that any of said extended list of codecs are available for use with the second link during the communications session.

14. The non-transitory computer-readable storage medium of claim 13, further comprising retrieving profile information associated with one or both of the communications devices, said profile information containing data indicative of whether the respective communications device is entitled to use the transcoding resource, whereby to determine if the transcoding element is available for the communications session.

15. The non-transitory computer-readable storage medium of claim 13, further comprising retrieving transcoding resource capacity information indicative of whether the transcoding resource has sufficient capacity to be available to the communications session, whereby to determine if the transcoding resource is available for the communications session.

16. The non-transitory computer-readable storage medium of claim 13, further comprising selecting the subset of codecs at the communications device.

17. The non-transitory computer-readable storage medium of claim 13, further comprising selecting the subset of codecs at the network apparatus.

18. The non-transitory computer-readable storage medium of claim 17, further comprising:
    receiving an offer to establish a communications session, the offer comprising data indicating that any of an offered selection of codecs are available for use during the communications session; and
    modifying the offer based on the selected subset of codecs.

* * * * *